United States Patent Office 3,510,522
Patented May 5, 1970

1

3,510,522
PURIFICATION OF HEXAMETHYLENEDIAMINE BY RECRYSTALLIZATION FROM CYCLOHEXANE
Donald R. Larkin, Corpus Christi, Theodore Horlenko, Houston, Hopkins Wade Tatum, Bay City, and Coy H. Hood and Wilber S. Cureton, Corpus Christi, Tex., assignors to Celanese Corporation, New York, N.Y., a corporation of Delaware
No Drawing. Continuation-in-part of application Ser. No. 571,691, Aug. 11, 1966. This application Sept. 9, 1968, Ser. No. 758,619
Int. Cl. C07c 85/16, 85/12, 85/06
U.S. Cl. 260—583
10 Claims

ABSTRACT OF THE DISCLOSURE

Process for purifying hexamethylenediamine such as is produced by the reductive ammonolysis of 1,6-hexanediol, by crystallization and recrystallization from hydrocarbons of 5 to 12 carbon atoms.

BACKGROUND OF THE INVENTION

The invention is a continuation-in-part of copending U.S. patent application Ser. No. 571,691, filed Aug 11, 1966, now abandoned.

Hexamethylenediamine is a valuable intermediate useful in the production of condensation products such as polyamides. Most of the hexamethylenediamine in commercial use today has been produced by the hydrogenation of adiponitrile and there are many patents relating to the purification of hexamethylenediamine produced according to such a process. For example, in U.S. Pat. No. 2,802,030, a process is described for the removal of impurities in hexamethylenediamine, particularly 1,2-diaminocyclohexane, produced by the hydrogenation of adiponitrile by a distillation process. U.S. Pat. Nos. 3,017,331, 3,048,635, 3,193,472, and 2,987,452 also relate to a process for the purification of hexamethylenediamine produced by the hydrogenation of adiponitrile.

Hexamethylenediamine according to the instant invention is prepared by the reductive ammonolysis of 1,6-hexanediol by mixing the diol with ammonia and passing it over an ammonolysis catalyst at about 1500 to 4000 p.s.i.g. and 150 to 250° C., preferably 2800 to 3300 p.s.i.g. and 180 to 220° C. Raney nickel is a preferred catalyst. In the ammonolysis reaction substantially all of the 6 carbon precursors of hexamethylenediamine formed in the ammonolysis reactions are recycled to the ammonolysis reactor where substantially all of these precursors are converted eventually to hexamethylenediamine Such a process is described, for example, in U.S. Pat. No. 3,268,588.

Hexamethylenediamine produced according to the above process (as described in U.S. Pat. No. 3,268,588), contains a number of impurities which must be removed

2 in order that the hexamethylenediamine be pure enough to be used in the formation of condensation polymerization products such as polyamides which are capable of producing fibers and filaments. Certain of these impurities can be removed by ordinary distillation techniques while others require more specialized treatment. The product of the ammonolysis reaction described above is an equilibrium mixture consisting predominantly of hexamethylenediamine, hexamethyleneimine, 6-aminohexanol, N-(6-aminohexyl) hexamethyleneimine, unreacted hexanediol and linear polymer as shown by the equation below.

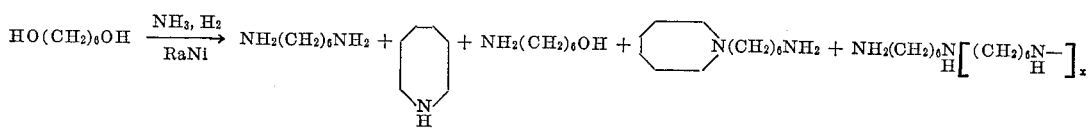

Other impurities present in the complex reaction mixture, present in lesser amounts, include such things as piperidine, amylamine, pentylhexamethylenimine, hexylhexamethylenimine, $\Delta^1$ - hexamethyleneimine, aminocapronitrile, 1,2-diaminocyclohexane, and 1,4-diaminocyclohexane.

SUMMARY

It is thus an object of the present invention to provide a method for the removal of impurities from hexamethylenediamine. Although the process of this invention is applicable to the removal of substantially all of the impurities found in hexamethylenediamine produced by either the hydrogenation of adiponitrile or by the preferred process described in U.S. Pat. No. 3,268,588, it has its greatest applicability in the removal of 1,4-diaminocyclohexane. The separation of 1,4-diaminocyclohexane from hexamethylenediamine by ordinary techniques is very difficult because of the closeness of the boiling points of the two compounds. The relative volatility of the system 1,4-diaminocyclohexane-hexamethylenediamine was found, for example to be about 1.1 at 100 and 200 mm. Hg pressure when the liquid phase contained 2.6 wt. percent of the 1,4-diaminocyclohexane. At 50 mm. Hg the relative volatility was about 1.2. Thus to separate 1,4-diaminocyclohexane from hexamethylenediamine by ordinary distillation techniques would require a column having a substantial number of trays operating under high reflux ratio. Such a process is not only expensive capital-wise but results in a substantial loss of hexamethylenediamine through degradation and through side stream losses.

It has been found unexpectedly that hexamethylenediamine containing impurities described above, particularly 1,4-diaminocyclohexane, can be readily purified by dissolving the crude hexamethylenediamine coming from the ammonolysis reaction zone in a hydrocarbon or mixture of hydrocarbons which are solvents for hexamethylenediamine and which contain from 5 to 12 carbon atoms at elevated temperatures and thereafter cooling the solution to crystallize the purified hexamethylenediamine.

DESCRIPTION OF THE PREFERRED EMBODIMENTS

The hydrocarbons of 5 to 12 carbon atoms that may be used as recrystallization solvents may be aromatic or non-aromatic, cyclic or acylic, saturated or unsaturated. Generally best results are obtained when using a saturated mononuclear aromatic hydrocarbon or a non-aromatic hydrocarbon which is free of acetylenic unsaturation and which has not more than two, preferably not more than one, ethylenic double bonds. The saturated nonaromatic hydrocarbons, that is, the alkanes and cycloalkanes, are especially preferred over the other hydrocarbons with cyclohexane being the preferred recrystallization solvent for use in the present process. Among the hydrocarbons that may be utilized as recrystallizaiton solvents in the present invention are n-pentane, n-hexane, n-heptane, n-octane, n-nonane, n-decane, 3-methylpentane, 2,2,4-trimethylpentane, 2,7-dimethyl-n-octane, 2-ethylhexane-cyclohexane, cyclohexene, ethylcyclohexane, cyclooctane, vinyl cyclohexane, vinyl cyclohexene, 2-methylpentene-1, pentene-2, decene-2, octene-1, 1,5-hexadiene, cyclooctene, benzene, xylene, toluene, styrene, cumene, mesitylene, ethylbenzene, cyclooctadiene, 1,3-cyclohexadiene, isoprene, 1-octyne, and the like. The hydrocarbon recrystallization solvent may be present in a weight ratio of hexamethylenediamine to cyclohexane ranging from 0.01 to 5.0.

The hexamethylenediamine to be purified is dissolved in the recrystallization solvent at elevated temperatures, i.e. at a temperature sufficient to effect complete solution. The temperature at which complete solution occurs will depend upon the particular hexamethylenediamine mixture employed and the particular hydrocarbon used as the recrystallization solvent. Temperatures from 25 to 100° C. and higher may be utilized but usually a temperature within the range of 30 to 60° C. is sufficient. Also the temperature to which the solution must be cooled to effect optimum crystallization is dependent on the same criteria. The determination of the most effective temperature is within the skill of the art although cooling to a temperature within the range from about 0 to 20° C. is generally sufficient. For example, it has been found that hexamethylenediamine is infinitely soluble in cyclohexane at temperatures above 40° C. Upon cooling the mixture to a temperature in the range of 7 to 20° C., hexamethylenediamine crystallizes and precipitates. The purified hexamethylenediamine is recovered by filtration and may be washed with a non-solvent to remove any residual cyclohexane. Further purification can be achieved, if desired, by redissolving the filter cake, recrystallizing, filtering and removing the residual cyclohexane by melting the filter cake from the second filtration and subjecting the cyclohexane-hexamethylenediamine mixture to fractional distillation.

In order to clearly understand the process of the instant invention, the following specific examples are appended which are merely intended to be illustrative and not limitative. In the examples all parts and percentages are by weight unless otherwise indicated.

EXAMPLE I

A crude hexamethylenediamine stream was dissolved in cyclohexane at about 45° C. After all of the hexamethylenediamine went into solution, the solution was cooled to about 20° C. or room temperature whereupon hexamethylenediamine crystallized. The hexamethylenediamine was 97.6 wt. percent purity before recrystallizing. Two crops of crystals containing 85% of the hexamethylenediamine charged were taken. Analyses of the crystals and filtrate showed that over 90% of the impurities remained in the filtrate leaving crystals which were 99.8% hexamethylenediamine. The results are shown below.

TABLE I.—RECRYSTALLIZATION OF HEXAMETHYLENEDIAMINE FROM CYCLOHEXANE
[Recrystallization carried out at room temperature]

| | Run No. | | | | | |
|---|---|---|---|---|---|---|
| | 1 | | | 2 | | |
| Stream | Crystallization mixture | Crystals | Filtrate | Crystallization mixture | Crystals | Filtrate |
| Weight, g | 1,527 | 485 | 1,042 | 4,817 | 1,063 | 3,750 |
| Composition, g.: | | | | | | |
| Hexamethylenediamine | 515 | 453 | 64 | 1,161 | 1,041 | 120 |
| Cyclohexane | 1,000 | 31 | 966 | 3,586 | 9 | 3,578 |
| N-alkyl-hexamethylenimines | 2 | ≈1 | ≈1 | | | |
| 1,4-diaminocyclohexane | 5 | <1 | 5 | 35 | 6 | 28 |

EXAMPLE II

An Ulich apparatus was used to crystallize hexamethylenediamine under a nitrogen atmosphere. Hexamethylenediamine was dissolved in hot cyclohexane in the bottom flask and the apparatus was then inverted to filter out amine carbonates. The filtered material was allowed to recrystallize slowly. The apparatus was inverted again and the cyclohexane drawn down into the bottom flask. The flask containing cyclohexane was replaced with an empty flask, the apparatus inverted so that the lower flask was the one containing crystalline hexamethylenediamine, and hexamethylenediamine heated under vacuum to drive off cyclohexane.

A sample of 1100 grams of hexamethylenediamine was crystallized from 500 ml. of cyclohexane by the method described above to give 1071 grams of recrystallized hexamethylenediamine. Evaporation of the cyclohexane filtrate gave 25.2 grams of crystalline material. The analysis of the material is shown below.

| | P.p.m. impurities in— | | |
|---|---|---|---|
| | Starting hexamethylenediamine | Recrystallized hexamethylenediamine | Residue from filtrate |
| N-hexylhoxamethylenimine | 1,000 | 140 | 40,000 |
| Δ¹-Hexamethylenimine | 3,500 | 1,340 | 34,500 |
| Hexamethylenimine | 450 | 60 | 7,000 |

The recrystallized hexamethylenediamine was recrystallized again from twice its volume of cyclohexane to give a product with the following level of impurities:

N-hexylhexamethylenimine—Not detectable
Δ¹-Hexamethylenimine—600
Hexamethylenimine—Not detectable

EXAMPLE III

A series of runs were made in which hexamethylenediamine was dissolved in hot cyclohexane and cooled to induce crystallization and filtered.

Run 1

Forty-eight point two g. of hexamethylenediamine containing 3100 p.p.m. of 1,4-diaminocyclohexane was dissolved in 138.0 g. of cyclohexane and allowed to cool to 25° C. The slurry was filtered through a sintered glass filter to give 45.8 g. (wet of hexamethylenediamine containing 340 p.p.m. 1,4-diaminocyclohexane. The mother liquor was chilled to 6–8° C. and filtered to give an additional 8.5 g. (wet) of hexamethylenediamine containing 2450 p.p.m. 1,4-diaminocyclohexane. The mother liquor weighted 117.5 g. and contained 0.099 g. of 1,4-diaminocyclohexane. Evaporation of the mother liquor gave a residue weighing 1.6 g.

Run 2

Two hundred forty-seven point two g. of hexamethylenediamine containing 3100 p.p.m. of 1,4-diaminocyclohexane was dissolved in 750.0 g. of cyclohexane and allowed to cool to 25° C. The slurry was collected on a sintered glass filter and washed with 100 g. of cyclohexane to give 179.5 g. (dry) of hexamethylenediamine containing 1832 p.p.m. 1,4-diaminocyclohexane. The wash liquid (106.0 g.) contained 0.040 g. of 1,4-diaminocyclohexane. The mother liquor was cooled to 8–10° C., filtered and washed with 50 g. of cyclohexane to give a second crop of hexamethylenediamine weighing 46.3 g. (dry) containing 1150 p.p.m. 1,4-diaminocyclohexane. The wash liquid weighed 48.3 g. and contained 0.027 g. of 1,4-diaminocyclohexane. The mother liquor weighed 649.5 g. and contained 0.61 g. of 1,4-diaminocyclohexane. Evaporation of the cyclohexane gave a residue weighing 6.1 g.

Run 3

One hundred sixty-nine g. of hexamethylenediamine containing 4100 p.p.m. of 1,4-diaminocyclohexane was dissolved in 330 g. of cyclohexane. The solution was cooled to 25° C. by refluxing the cyclohexane under vacuum. Crystallization began at 35° C. The slurry was filtered to give 214 g. (wet) of crystals and 262 g. of mother liquor. The crystals had a dry weight of 142.5 g. and contained 90±25 p.p.m. of 1,4-diaminocyclohexane. The crystals were washed with 100 g. of cyclohexane at 25° C. to leave 136 g. (dry weight) of crystals containing a 1,4-diaminocyclohexane concentration of 70±25 p.p.m. Evaporation to dryness of the filtrate gave 6.5 g. of solid containing 1.6 percent 1,4-diaminocyclohexane. A second wash with 100 g. of cyclohexane left 133 g. (dry weight) of crystals containing 35±8 p.p.m. of 1,4-diaminocyclohexane. The filtrate contained 3.0 g. of solid containing 3900 p.p.m. 1,4-diaminocyclohexane. Cooling the mother liquor to 8° C. afforded 14.5 g. of solid containing 5700 p.p.m. diaminocyclohexane. Evaporation of the filtrate of the mother liquor to dryness gave 5.5 g. of solid containing 8.15 percent 1,4-diaminocyclohexane. All filtrations in this run were made with a rubber dam over the filter cake.

Run 4

One hundred sixty-nine g. of hexamethylenediamine containing 4100 p.p.m. of 1,4-diaminocyclohexane was dissolved in 330 g. of cyclohexane and cooled to 10° C. with external cooling and vigorous stirring. The slurry was filtered to give 158.6 g. (dry weight) of hexamethylenediamine containing 105±25 p.p.m. of 1,4-diaminocyclohexane. The mother liquor was evaporated to dryness to give 6.5 g. of material that contained 5.2 weight percent 1,4-diaminocyclohexane. Washing the filter cake with 100 g. of cold (10° C.) cyclohexane leached out 1.85 g. of solid containing 4.6 weight percent 1,4-diaminocyclohexane. A second wash with 100 g. of cold (10° C.) cyclohexane leached out 1.6 g. of solid containing 2.6 weight percent 1,4-diaminocyclohexane. The filter cake weighed 155.1 g. and contained 71±25 p.p.m. diaminocyclohexane. The wet filter cake weighed 192 g. All filtrations in this series were allowed to go for only 15–25 seconds before the vacuum was turned off.

Run 5

Three hundred twenty-four g. of hexamethylenediamine was dissolved in 165 g. of cyclohexane and cooled to 15° C. with external cooling and vigorous stirring. The hexamethylenediamine contained 4100 p.p.m. of 1,4-diaminocyclohexane. The slurry was filtered to give 315.5 (dry basis) of hexamethylenediamine containing 1090 p.p.m. of 1,4-diaminocyclohexane. The mother liquor was evaporated to dryness to give 1.2 g. of solid that contained 20.1 percent of 1,4-diaminocyclohexane. Washing the filter cake with 100 g. of cold (15° C.) cyclohexane left 312.7 g. (dry) of hexamethylenediamine with 390 p.p.m. of 1,4-diaminocyclohexane. The filtrate contained 2.8 g. of solid containing 9.4 percent of 1,4-diaminocyclohexane. A second wash left a filter cake weighting 310.9 g. (dry) with 350 p.p.m. of 1,4-diaminocyclohexane. The filtrate contained 1.8 g. of solid with 8.5 weight percent 1,4-diaminocyclohexane. The wet weight of the filter cake was 364. g.

Run 6

One hundred seventy-six point seven g. of hexamethylenediamine containing 3100 p.p.m. of 1,4-diaminocyclohexane was dissolved in 345.1 g. of cyclohexane. The solution was cooled to 11–12° C. with external cooling. The slurry was filtered to give 164.3 g. (dry weight) of hexamethylenediamine and 254.1 g. of mother liquor. Evaporation of the mother liquor to dryness gave 8.54 g. of solid that contained 4.9 weight percent 1,4-diaminocyclohexane. Washing the filter cake with 100 g. of cold (15° C.) cyclohexane leached out 2.26 g. of solid containing 4.4 weight percent 1,4-diaminocyclohexane. A second wash with 100 g. of cold (15° C.) of cyclohexane leached out 1.93 g. of solid containing 2.0 weight percent 1,4-diaminocyclohexane. The dried filter cake weighed 160.1 and contained 110 p.p.m. of 1,4-diaminocyclohexane. The wet filter cake weighed 192.1 g.

Run 7

Two hundred sixty-two point nine of hexamethylenediamine containing 380 p.p.m. of 1,4-diaminocyclohexane was dissolved in 166.9 g. of cyclohexane. The solution was cooled to 13° C. with external cooling and vigorous stirring. The slurry was filtered and the mother liquor was evaporated to give 1.75 g. of material that contained 0.96 weight percent 1,4-diaminocyclohexane. Washing the filter cake with 100 g. of cyclohexane leached out 1.76 g. of material that contained 0.87 weight percent of 1,4-diaminocyclohexane. A second wash with 100 g. of cyclohexane removed 2.10 g. of solid with 0.52 weight percent 1,4-diaminocyclohexane. The filter cake weighed 241.5 g. (dry) and contained 120 p.p.m. of 1,4-diaminocyclohexane.

The data in the above seven runs is summarized in Table II.

TABLE II

| Run number | 1 | 2 | 3 | 4 | 5 | 6 | 7 |
|---|---|---|---|---|---|---|---|
| Initial 1,4-diaminocyclohexane conc., p.p.m. | 3,100 | 3,100 | 4,100 | 4,100 | 4,100 | 4,100 | 3,800 |
| Wt. hexamethylenediamine: wt. cyclohexane | 1:3 | 1:3 | 1:2 | 1:2 | 2:1 | 1:2 | 1.6:1 |
| Recryst. temperature, °C | 25 | 25 | 25 | 10 | 15 | 11 | 13 |
| Eff. to purified hexamethylenediamine, percent | 85 | 73 | 70 | 92 | 96 | 91 | 97 |
| Final diaminocyclohexane conc., p.p.m. | 340 | 25 | 35 | 70 | 350 | 110 | 125 |
| 1,4-diaminocyclohexane conc. in residue | | | 8.2 | 5.2 | 20 | 4.9 | 0.96 |

EXAMPLE IV

One thousand grams of hexamethylenediamine containing 0.31 wt. percent 1,4-diaminocyclohexane was melted and left to cool slowly. At intervals, the liquid was poured into another container and the crystalline material weighed and analyzed. The first three fractions represented 4.0, 13.2, and 10.3 wt. percent of the hexamethylenediamine charged, and contained 0.06, 0.08 and 0.1% 1,4-diaminocyclohexane respectively. It was clear and apparent that the purification achieved by melt crystallization was not at all comparable to that achieved by solvent crystallization from cyclohexane.

EXAMPLE V

Four hundred point zero grams of a crude hexamethylenediamine mixture containing 1.88 grams of 1,4-diaminocyclohexane (4700 p.p.m.) was introduced along with a recycle stream containing 333.80 grams cyclohexane, 10.30 grams hexamethylenediamine, and 0.40 gram 1,4-diaminocyclohexane into a dissolver vessel wherein hexamethylenediamine was dissolved. The crude hexamethylenediamine solution was then fed into a first crystallizer zone. The hexamethylenediamine mixture was charged to the crystallizer vessel under nitrogen and warm water (45° C.) was circulated through the jacket of the crystallizer. The warm water was allowed to stand in the jacket and the mixture in the first crystallizer zone was cooled by refluxing the cyclohexane under vacuum. The temperature of the crystallizer mixture was determined by means of the pressure required to reflux the cyclohexane. Crystallization began at 31° C. (120 mm. Hg) and was continued until the temperature reached 13° C. (55 millimeters mercury). At this point excess cyclohexane was removed through a fritted glass filter under 15 p.s.i. nitrogen pressure.

Cold water (15° C.) was circulated through the jacket of the filter zone and a wash solution of cyclohexane containing small amounts of hexamethylenediamine and 1,4-diaminocyclohexane was added to the filter zone through the condenser. The wash liquid was refluxed to lower its temperature and then it was removed by filtration under nitrogen pressure.

Warm water (45° C.) was then passed through the jacket of the filter zone to melt the filter cake. The molten hexamethylenediamine-cyclohexane mixture was then drained from the filter zone, weighed, redissolved in a solution of cyclohexane obtained from the washing step, and placed in a second crystallizer zone. The crystallization and wash cycles were then repeated as described above. A stream of purified hexamethylenediamine was taken from the second filter zone and topped to remove cyclohexane. A vapor stream of hexamethylenediamine, taken 5 trays above the reboiler at 154.5° C. and 200 mm., showed the following analysis:

TABLE III

Purity of recrystallized hexamethylenediamine

| Analyses: | Results |
|---|---|
| Appearance, 60% sol in water | Clear. |
| Color, 60% sol in water | 5 APHA. |
| Total base (M.W. in 116.2) | 99.8%. |
| Crystallizing point | 40.95° C. |
| Ammonia | 6 p.p.m. |
| Aminocapronitrile | 13 p.p.m |
| 1,2-diaminocyclohexane | 11 p.p.m. |
| 6-aminohexanol | |
| Hexamethyleneimine | 10 p.p.m. |
| HMI-hexamethyleneimine | <20 p.p.m. |
| Polarographically reducible impurities, p.p.m. | 113. |
| Iron, p.p.m. | 1.3. |
| 1,4-diaminocyclohexane | None detected. |
| UV abs., 260 mμ | 0.14. |
| UV abs., 280 mμ | 0.06. |

EXAMPLE VI

A hexamethylenediamine mixture (10.63 g.) comprising about 49.7% hexamethylenediamine, 17.7% cis 1,4-diaminocyclohexane, 7.6% trans 1,4-diaminocyclohexane, 12.8% 1,2-diaminocyclohexane and 12.2% cyclohexane was dissolved in 3.70 g. of hexane at about 50° C. The mixture was allowed to cool to 0° C. to crystallize the hexamethylenediamine. The slurry was filtered and washed to give 3.32 of hexamethylenediamine containing about 1.7% cis-1,4-diaminocyclohexane, 0.0% trans 1,4-diaminocyclohexane and 1.5% 1,2-diaminocyclohexane.

EXAMPLE VII

A run was made in which about 50 grams of hexamethylenediamine containing about 5400 p.p.m. of 1,4-diaminocyclohexane was dissolved at 60° C. in 50 milliliters of hexene-1. The solution was then cooled to about 20° C. so as to recrystallize the hexamethylenediamine and then filtered under nitrogen. After washing the crystals with a small amount of cold hexene-1, the crystals were dried in a vacuum desiccator. The dried, purified crystals of hexamethylenediamine weighed about 46.1 grams and contained less than 100 p.p.m. of 1,4-diaminocyclohexane.

EXAMPLE VIII

The experiment of Example VII was repeated except that cyclohexene was substituted for the hexene-1. About 41.3 grams of crystals were recovered containing less than 100 p.p.m. of 1,4-diaminocyclohexane.

EXAMPLE IX

The procedure of Example VII was repeated except that toluene was substituted for the hexene-1. Also in this experiment the solution was cooled to about 10° C. to recrystallize the hexamethylenediamine. About 39.8 grams of hexamethylenediamine crystals were recovered containing less than 100 p.p.m. 1,4-diaminocyclohexane.

The embodiments of the invention in which an exclusive property or privilege is claimed are defined as follows:

1. A process for purifying hexamethylenediamine which has been prepared by the hydrogenation of adiponitrile or by the reductive ammonolysis of 1,6-hexanediol which process comprises dissolving said hexamethylenediamine in a recrystallization solvent comprising a hydrocarbon having from 5 to 12 carbon atoms at a temperature sufficient to effect complete solution, cooling the solution to form a crystalline product, and separating the crystalline product from the solvent.

2. Process according to claim 1 wherein the hexamethylenediamine is derived from the reductive ammonolysis of 1,6-hexanediol carried out in the presence of a Raney nickel catalyst.

3. Process according to claim 1 wherein the hexamethylenediamine contains 1,4-diaminocyclohexane as an impurity.

4. Process according to claim 1 wherein the hexamethylenediamine contains $\Delta^1$-hexamethyleneimine as an impurity.

5. Process according to claim 1 wherein said hydrocarbon is (1) a saturated mononuclear aromatic hydrocarbon or (2) a non-aromatic hydrocarbon which is free of acetylenic unsaturation and which has not more than one ethylenic double bond.

6. Process according to claim 5 wherein said hydrocarbon is a saturated mononuclear aromatic hydrocarbon.

7. Process according to claim 1 wherein the recrystallization solvent is an alkane or cycloalkane having from 5 to 12 carbon atoms.

8. Process according to claim 7 wherein the temperature needed to effect solution ranges from about 40 to 60° C.

9. Process according to claim 8 wherein the solution is cooled to a temperature ranging from 0 to 20° C.

10. Process for purifying hexamethylenediamine which contains the impurity 1,4 - diaminocyclohexane, which comprises dissolving the hexamethylenediamine in a recrystallization solvent comprising cyclohexane at a temperature ranging from 40 to 60° C., cooling the solution to at least 20° C. to form crystalline hexamethylenediamine, and separating the purified hexamethylenediamine from the recrystallization solvent.

References Cited

UNITED STATES PATENTS

| | | |
|---|---|---|
| 3,017,331 | 1/1962 | Campbell et al. |
| 3,048,635 | 8/1962 | Indest et al. |
| 3,193,472 | 7/1965 | Isacks. |
| 3,254,126 | 5/1966 | Griffith et al. |
| 3,268,588 | 8/1966 | Horlenko et al. |

CHARLES B. PARKER, Primary Examiner

R. L. RAYMOND, Assistant Examiner

U.S. Cl. X.R.

260—585

UNITED STATES PATENT OFFICE
CERTIFICATE OF CORRECTION

Patent No. 3,510,522            May 5, 1970

Donald R. Larkin et al.

It is certified that error appears in the above identified patent and that said Letters Patent are hereby corrected as shown below:

Columns 3 and 4, Table I, third column, line 5 thereof, "—1" should read -- $<1$ --. Columns 5 and 6, Table II, fourth column, line 4 thereof, "70" should read -- 79 --; same table, eighth column line 1 thereof, "3,800" should read -- 380 --.

Signed and sealed this 2nd day of March 1971.

(SEAL)
Attest:

Edward M. Fletcher, Jr.          WILLIAM E. SCHUYLER, JR.
Attesting Officer                    Commissioner of Patents